United States Patent [19]

Palmer et al.

[11] 4,043,922
[45] * Aug. 23, 1977

[54] SECONDARY OIL RECOVERY PROCESS USING OXYALKYLATED ADDITIVES

[75] Inventors: Harold A. Palmer; Thomas E. Sample, Jr., both of Houston, Tex.

[73] Assignee: Texaco Inc., New York, N.Y.

[*] Notice: The portion of the term of this patent subsequent to May 8, 1990, has been disclaimed.

[21] Appl. No.: 590,650

[22] Filed: June 26, 1975

Related U.S. Application Data

[63] Continuation-in-part of Ser. No. 451,712, March 15, 1977, abandoned.

[51] Int. Cl.$^2$ .................. E21B 43/22; E21B 43/24
[52] U.S. Cl. .................. 252/8.55 D; 166/272; 166/274; 166/275; 260/613 B
[58] Field of Search .................. 252/8.55 D, DIG. 1; 166/272, 274, 275; 260/613 B

[56] References Cited

U.S. PATENT DOCUMENTS

| | | | |
|---|---|---|---|
| 2,233,381 | 2/1941 | DeGroote et al. | 252/8.55 |
| 2,677,700 | 5/1954 | Jackson et al. | 260/613 X |
| 2,724,716 | 11/1955 | Dickey et al. | 260/613 X |
| 3,203,955 | 8/1965 | Jackson et al. | 260/613 X |
| 3,455,386 | 7/1969 | Reisberg | 166/275 |
| 3,554,286 | 1/1971 | Feuerbacher et al. | 166/272 X |
| 3,731,741 | 5/1973 | Palmer et al. | 166/272 |

Primary Examiner—Herbert B. Guynn
Attorney, Agent, or Firm—Thomas H. Whaley; Carl G. Ries; Walter D. Hunter

[57] ABSTRACT

A process for the recovery of hydrocarbon materials from a subterranean hydrocarbon-bearing formation by contacting the formation with an aqueous alkaline flooding medium containing a solubilizing agent. Useful solubilizing agents include for example, block-type compounds of the formula:

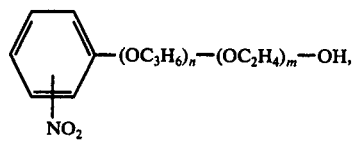

wherein $n$ is an integer of from 1 to about 10 and $m$ is an integer of about 5 to about 40.

9 Claims, No Drawings

SECONDARY OIL RECOVERY PROCESS USING OXYALKYLATED ADDITIVES

This application is a continuation-in-part of application Ser. No. 451,712, filed Mar. 15, 1974, now abandoned.

BACKGROUND OF THE INVENTION

1. Field of the Invention

This invention relates to an improved process for the recovery of hydrocarbon materials from hydrocarbon-bearing formations. More particularly, the invention relates to a process in which hydrocarbons, including asphaltic crudes, are recovered from a reservoir by contacting the formation with an aqueous alkaline flooding medium containing a solubilizing agent.

2. Description of the Prior Art

The production of petroleum products is usually accomplished by drilling into a hydrocarbon-bearing formation and utilizing one of the well-known recovery methods for the recovery of the hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70-80% of the original hydrocarbons in place.

Thus, many large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30-50% of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery by this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes.

Consequently, process modifications have been developed which may incorporate additives to lessen the above cited disadvantages and thereby improve the efficiency of these processes. For example, surface-active agents and miscible liquids are utilized to decrease the interfacial tension between the water and the reservoir crude, and thickeners have been developed to adjust viscosity so as to inhibit fingering.

The practiced methods for the injection of additives commonly consist of injection of a slug of additive, contained in a transporting medium, e.g. water, into the formation and then following this injection with a flood water to move the additive slug through the formation. In its ideal effect, the so-called slug moves through the formation as an additive bank, thereby imparting its beneficiating effects to the recovery process.

In many hydrocarbon-bearing formations it is common to find the oil sands to be preferentially wetted by oil. It is well known in the art to inject into these preferentially oil-wetted formations certain chemicals to reverse the wettability characteristics of the formation, thereby increasing the effectiveness of a water flood to remove the residual crude. For example, a dilute alkaline aqueous solution is known to increase the wetting characteristics of sand surfaces, and promote a leaching action and emulsification of the tarry materials. Those solutions have been used as slugs in conjunction with subsequent steam injection processes to force the emulsions thus formed through the formation to a production well.

Improved recoveries from heavy crudes or tar sands have been realized also by the use of dilute aqueous alkaline solutions containing an effective amount of non-ionic surfactant, whereby extraction is effected by the spontaneous emulsification when the aqueous liquid comes in contact with the tar in the sand.

However, some of the disadvantages of those additive recovery processes include the problem that the additive may be strongly absorbed in the surfaces of the sand formation, resulting in a large or excessive amount of additive being required. The costs involved of these additives, which may be relatively expensive, may become excessive early in the life of the recovery process necessitating its termination. Other disadvantages include the unfavorable viscosity ratio between the flooding medium and the crude.

It is known that the recovery of oil by injection of water or other fluids varies substantially from one formation to another and it is believed that the asphalt content of the hydrocarbons of some formations is at least a major factor responsible for this variation. A variety of known asphalt dispersants have been employed in flooding media on the theory that such materials would substantially improve hydrocarbon recovery in those instances where asphalt was present in the native hydrocarbon, however, the use of such materials has not been particularly effective, probably because of the limited solubility of such agents in the normally employed flooding fluids. There is a definite need in the art, therefore, for a recovery process employing asphalt dispersants with improved solubility characteristics.

One of the principal objects of this invention is to provide an improved process for increasing the ultimate recovery of hydrocarbon from a hydrocarbon-bearing formation.

Another object of this invention is to provide an efficient method for the recovery of hydrocarbon from a hydrocarbon-bearing formation in which an aqueous alkaline flooding medium containing as a solubilizing agent a watersoluble, oxyalkylated, nitrogen-containing aromatic compound is utilized.

BRIEF SUMMARY OF THE INVENTION

This invention relates to a method for recovering hydrocarbons from a subterranean hydrocarbon-bearing formation having in communication therewith at least one injection well and one production well comprising:

(a) injecting into the said formation through said injection well an aqueous alkaline flooding medium containing a solubilizing agent comprising a solution of a nitrophenol which has been first reacted with propylene oxide and then with ethylene oxide or of a nitrophenol which has first been reacted with a mixture of ethylene oxide and propylene oxide and then with ethylene oxide, made alkaline with sodium hydroxide, (b) forcing said alkaline flooding medium through the formation, and (c) recovering hydrocarbons through said production well.

DETAILED DESCRIPTION OF THE INVENTION

The aqueous alkaline flooding medium employed in the process of this invention comprises an aqueous medium which can be, for example, steam, hot water, a mixture of hot water and steam or cold water together with an alkaline agent containing a solubilizing agent or a mixture of solubilizing agents. Useful alkaline agents includes compounds selected from the group consisting of an alkali metal hydroxide, alkali metal hypochlorites, an alkaline earth metal hydroxide and a basic salt of the alkali metal or alkaline earth metal which is capable of hydrolyzing in an aqueous medium to given an alkaline solution, the concentration of the alkaline agent being about 0.001 to about 0.5 molar to give the required alkaline solution. Examples of the especially useful alkaline agents include sodium hydroxide, potassium hydroxide, lithium hydroxide, ammonium hydroxide, sodium hypochlorite, potassium hypochlorite, sodium carbonate and potassium carbonate, etc.

solubilizing materials useful in the process of this invention include water-soluble, oxyalkylated nitrogen-containing aromatic compounds where preferably the aromatic compound contains not more than 12 carbon atoms and the number of oxyalkyl units is about 5 to about 50.

An especially useful group of the water-soluble, oxyalkylated, nitrogen-containing aromatic compounds include compounds of the formula:

$$R(OR')_mOH$$

wherein R is selected from the group consisting of:

(a) 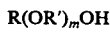

(b) 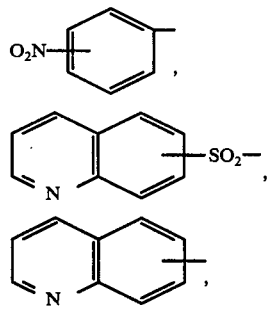

(c)

wherein R' is alkylene of from 2 to 4 inclusive carbon atoms, and m is an integer of from about 5 to about 50 and preferably, from about 5 to about 20.

The above-listed water-soluble oxyalkylated products of this invention can be conveniently prepared by a number of processes well-known in the art. For example, the alkylene oxide or mixture of alkylene oxides can be reacted with the initiator dissolved in a suitable solvent throughout which an alkaline catalyst, such as potassium hydroxide or sodium hydroxide, in uniformly dispersed. The quantity of the catalyst utilized generally will be from about 0.15 to about 1.0 percent by weight of the reactants. Preferably, the reaction temperature will range from about 80° C to about 180° C while the reaction time will be from about 1 to about 20 hours or more depending on the particular reaction conditions employed. This process is more completely described in U.S. Pat. No. 2,425,845.

Another especially suitable group of solubilizing compounds useful in the process of this invention include oxyalkylated derivatives containing block polypropylene and polyethylene groups having the formula:

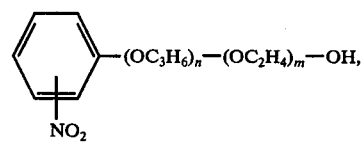

wherein n is an integer of from 1 to about 10 and m is an integer of from 5 to about 40 and, preferably, n is an integer of from 4 to about 8 and m is an integer of from 5 to about 20.

Compounds of the above formula can be prepared by well-known methods such as taught, for example, in U.S. Pat. Nos. 3,062,747; 2,174,761 or in 2,425,755. In general, the procedure consists in condensing a nitrophenol with propylene oxide in the presence of an oxyalkylation catalyst until the required amount of the oxide has reacted then continuing the oxyalkylation reaction with the ethylene oxide until the desired block oxyalkylated polymer is formed.

Heteric oxyalkylated nitrophenols are also useful as solubilizing agents in the process of this invention such as for example, heteric (i.e., random) copolymers of ethylene oxide and propylene oxide prepared by reacting a mixture of ethylene oxide and propylene oxide with a nitrophenol and then reacting the thus-formed heteric product with ethylene oxide to form compounds of the formula:

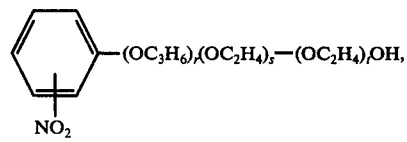

wherein the sum of r plus s is an integer of from 2 to about 12 and with the proviso that r and s are each not less than 1, t is an integer of from 5 to about 32 and preferably r is an integer of from 2 to about 6, s is an integer from 3 to about 6 and t is an integer of from 5 to about 20. Compounds of this type can be prepared by a variety of methods well known in the art such as by the processes set forth in U.S. Pat. No. 2,425,755 and 2,425,845.

The solubilizing agent should be present in the aqueous solution in sufficient concentration to effect the emulsification of the hydrocarbon material and maintain them in this state during passage through the formation. Concentrations in solutions of from about 0.05 to about 5.0 percent by weight of the solubilizing agent are usually sufficient, although smaller or larger amounts may be employed satisfactorily in some cases.

The advantageous results achieved with the aqueous alkaline flooding medium used in the process of this invention are believed to be derived from the wettability improving characteristics of the alkaline agent and the solubilizing action of the solubilizing agent on the crude oil such as in tar sands and in other formations and especially on the asphaltene fractions. The solubilizing agent is believed to be effective in releasing the crude from the pore surfaces or the sand surfaces as the case may be so that the surfaces can be exposed to the alkaline agent.

A further advantage of the aqueous alkaline flooding medium of this invention is believed to result from its ability to emulsify the extracted crude to form an oil in water emulsion. The effectiveness of the flooding medium is also thought to result to a great extent from its action on the heavier complex hydrocarbon materials referred to as asphaltenes present to some extent in all crudes and especially in low-gravity viscous crudes and oils such as those found in tar sands which are extremely difficult to recover. It has been shown that asphaltene fractions are reresponsible in a large part for the adhesive force which many oils and especially heavy crudes and tars have for the mineral surfaces of the hydrocarbon-bearing formations.

In operating the process of this invention one embodiment may consist of drilling an injection well into the formation through which the aqueous flooding medium is injected into the formation. The flooding medium may be injected continuously or a slug of the aqueous alkaline flooding medium containing the solubilizing agent may be injected into the formation followed by injection of a slug of an aqueous drive fluid such as water, hot water, or steam.

During the passage of the aqueous alkaline flooding medium of this invention which contains the solubilizing agent hydrocarbons are stripped from the formation, forming an oil-in-water emulsion which can then be produced at neighboring wells. Recovery of the hydrocarbons from the emulsion can be accomplished by any one of several well known emulsion breaking techniques.

PREPARATION OF ETHOXYLATED-8-HYDROXY QUINOLINES

A series of four polyethoxylated-8 hydroxy quinoline solubilizing agents having the general formula:

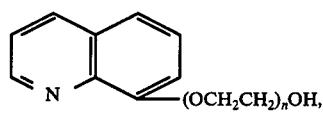

where $n$ is the number of oxyethyl units were prepared as described below:

To a 250 ml reaction flask there was added 27.2 grams (0.068 mole) of polyethylene glyol (mol. wt. 400) and 3.7 grams (0.066 mole) of potassium hydroxide. The reaction mixture was heated gently until the potassium hydroxide had dissolved at which time the temperature of the contents of the flask was about 80° C. A total of 9.7 grams (0.0625 mole) of 8-hydroxyquinoline was added to the reaction flask over a period of 10 minutes after which the reaction mixture was heated to 135°–140° C. and held at that temperature for 4 hours. After standing overnight, the reaction mixture was steam distilled to remove unreacted polyethylene glycol and water was then removed from the oxyalkylated product by evaporation. Yield: 33 grams. The molecular weight of the product was determined in dimethyl formamide solution using a vapor pressure osmometer and found to be 478 (Product B).

Three additional polyethoxylated products were prepared (i.e., Products A, C and D) utilizing 8-hydroxyquinoline as the initiator in the same manner as described above except that polyethylene glycols having respectively molecular weights of 300, 600 and 1000 were employed. Details relating to these four polyethoxylated compounds are set forth in Table 1 which follows:

TABLE 1

MOLECULAR WEIGHTS OF POLYETHOXYLATED-8-HYDROXYQUINOLINES

| PRODUCT | MOLECULAR WEIGHT | n |
|---------|------------------|---|
| A | 365 | 5 |
| B | 478 | 8 |
| C | 630 | 11 |
| D | 886 | 17 |

PREPARATION OF ETHOXYLATED 8-QUINOLINE SULFONIC ACID

Equal quantities by weight of 8-quinolinesulfonic acid and phosphorous pentachloride were ground together in a mortar. This mixture was then refluxed at approximately 140° C. for 3 hours after which work-up of the reaction mixture gave 8-quinolinesulfonyl chloride.

Seven grams (0.031 moles) of the 8-quinolinesulfonyl chloride was gradually added to a mixture of polyethylene glycol (mol. wt. 600, 0.034 moles) and 1.7 grams of potassium hydroxide which had been pre-heated to 95° C. The mixture was then heated to a temperature of 140°–150° C. and allowed to remain at that temperature for 4 hours. After work-up the product, ethoxylated 8-quinolinesulfonic acid, was obtained in about 75 percent yield. The molecular weight of the product was determined at 62° C. in dimethyl formamide solution utilizing a vapor pressure osmometer and found to be 764 (theoretical 791).

Three additional ethoxylated quinoline sulfonic acid derivatives were prepared in the same manner as described above by reacting equimolar quantities of polyethylene glycol having a molecular weight of 200, 400 and 1000 respectively with 8-quinolinesulfony chloride. In each instance the yield of the desired product was about 75 percent.

PREPARATION OF BLOCK POLYPROPYLENE, POLYETHYLENE REACTION PRODUCTS WITH NITROPHENOL

One mole of p-nitrophenol is by stabilization to an autoclave and 0.1 weight percent of powdered potassium hydroxide catalyst based on the weight of the phenol is added following which the autoclave is sealed, flushed with nitrogen, and heated to 150° C. Next three moles of propylene oxide are gradually fed in and after about three hours with stirring the reaction is complete as indicated by stabilization of pressure. A total of six moles of ethylene oxide is then introduced into the autoclave maintained at 150° C and after about three hours the action is complete. The block-type reaction product, an amber-colored, oily, viscous liquid of the formula:

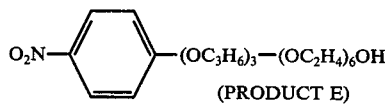
(PRODUCT E)

is recovered in substantially quantitative yield. If desired, the catalyst can be removed from the product by neutralization with an acid such as phosphoric acid, followed by filtration.

PREPARATION OF REACTION PRODUCTS OF NITROPHENOL WITH A MIXTURE OF ETHYLENE OXIDE AND PROPYLENE OXIDE FURTHER REACTED WITH ETHYLENE OXIDE

One mole of m-nitrophenol is charged to an autoclave and 0.1 weight percent of powdered potassium hydroxide based on the weight of the phenol is added following which the autoclave is sealed and flushed with nitrogen. Stirring is commenced and the autoclave is heated to about 150° C. Then a mixture comprising 3 moles of propylene oxide and two moles of ethylene oxide is introduced into the autoclave with stirring over a period of about 3 hours at which time the reaction is complete as evidenced by no further change in pressure. Next eight moles of ethylene oxide are added at 150° C with stirring and after three hours there is no further change in pressure is observed indicating completion of the reaction. The catalyst is neutralized with a fatty acid and the product recovered by filtration. The product, a viscous amber-colored liquid of the formula:

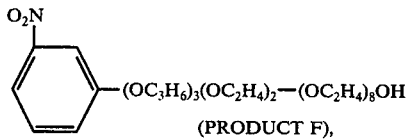
(PRODUCT F), is recovered in substantially quantitative yield after neutralization of the catalyst followed by filtration.

The following examples which illustrate various embodiments of the process of this invention are to be considered not limitative.

EXAMPLES I-IV

A series of flow tests utilizing as a flooding medium an aqueous alkaline flooding medium and as a solubilizing agent Products E and F is carried out. Small sand packs are prepared using 150/200 mesh Ottawa sand and having pore volumes of approximately 30 ml. The packs are saturated with brine which is displaced with Slocum crude oil (API gravity 17.5) to irreducible water saturation. In the next step the oil saturation of the pack is reduced to approximately 80 percent by flooding with 8 pore volumes of distilled water. Ths initial waterflood is followed by the injection into each pack of 8.5 pore volumes of 0.5 volume percent of a solution of Products E and F respectively at three different pH values, namely 7, 12 and 13. A substantial increase in the amount of oil recovered is achieved over the amount of oil recovered in separate comparative tests with quinoline as a solubilizing agent or with alkaline water alone.

In a like manner a substantially increased oil recovery is achieved when, for example, the other abovedescribed oxyalkylated products were employed in the process of this invention. Mixtures of Products E and F with any of the other oxyalkylated products previously described may also be employed in the recovery process of this invention.

What is claimed is:

1. A method of recovering hydrocarbons from a subterranean hydrocarbon-bearing formation having in communication therewith at least one injection well and at least one production well comprising:
  a. injecting into the said formation through said injection well an aqueous alkaline flooding medium containing a solubilizing agent comprising a water-soluble, oxyalkylated, nitrogen-containing aromatic compound,
  b. forcing said alkaline flooding medium through the formation and,
  c. recovering hydrocarbons through said production well, wherein the said water-soluble oxyalkylated, nitrogencontaining aromatic compound is selected from the group consisting of:
  A. a block-type, water-soluble, oxyalkylated compound of the formula:

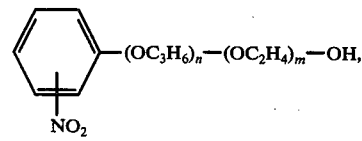

wherein n is an integer of from 1 to about 10 and m is an integer of from 5 to about 40, and
  B. a random-type, water-soluble oxyalkylated compound which has been further reacted with ethylene oxide having the formula:

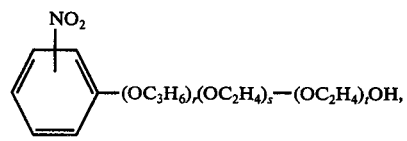

wherein the sum of r plus s is an integer of from 2 to about 12 and with the proviso that r and s are each not less than 1 and t is an integer of from 5 to about 32 and wherein the said aqueous alkaline flooding medium contains an alkaline agent selected from the group consisting of alkali metal hydroxides, alkali metal hypochlorites, alkaline earth metal hydroxides, and mixtures thereof.

2. The method of claim 1 wherein the said nitrogen-containing compound has the formula:

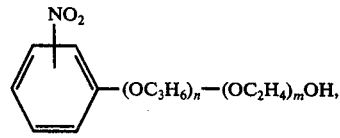

wherein n is an integer of from 1 to about 10 and m is an integer of from 5 to about 40.

3. The method of claim 1 wherein the said nitrogen-containing aromatic compound is a random type oxyalkylated compound which has been further reacted with ethylene oxide and has the formula:

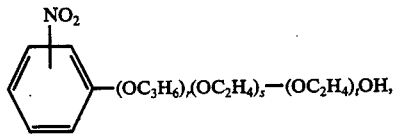

wherein the sum of r plus s is an integer of from 2 to about 12, and with the proviso that r and s are each not less than 1 and t is an integer of from 5 to about 32.

4. The method of claim 1 wherein the said nitrogen-containing aromatic compound is:

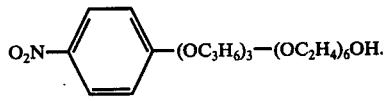

5. The method of claim 1 wherein the said nitrogen-containing aromatic compound is prepared by oxyalkylating m-nitrophenol with a mixture of three moles of propylene oxide and two moles of ethylene oxide and then with eight moles of ethylene oxide and has the formula:

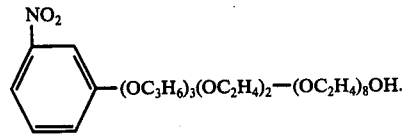

6. The method of claim 1 wherein the said aqueous alkaline flooding medium comprises an aqueous medium containing an alkaline agent selected from the group consisting of alkali metal hydroxides, alkali metal hypochlorites, alkaline earth metal hydroxides and mixtures thereof.

7. The method of claim 6 wherein said alkaline agent is sodium hydroxide.

8. The method of claim 6 wherein the said alkaline agent is contained in the aqueous medium in amounts in the range of from about 0.001 to about 0.5 molar.

9. The method of claim 6 wherein the said aqueous medium is steam.

* * * * *